(12) United States Patent
Epling et al.

(10) Patent No.: US 9,141,716 B2
(45) Date of Patent: Sep. 22, 2015

(54) SEARCHING AND BROWSING URLS AND URL HISTORY

(75) Inventors: Jeremiah Seth Epling, Redmond, WA (US); Li-Hsin Huang, Bellevue, WA (US); Cornelis K. Van Dok, Bellevue, WA (US); Jeffrey M. Davis, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 12/898,534

(22) Filed: Oct. 5, 2010

(65) Prior Publication Data

US 2011/0022971 A1 Jan. 27, 2011

Related U.S. Application Data

(62) Division of application No. 11/719,155, filed on Jul. 12, 2005, now Pat. No. 7,831,547.

(51) Int. Cl.
*G06F 17/30* (2006.01)
*G06F 9/44* (2006.01)

(52) U.S. Cl.
CPC ........ *G06F 17/30884* (2013.01); *G06F 9/4443* (2013.01)

(58) Field of Classification Search
CPC .................................................... G06F 17/30
USPC .................................................. 707/600–899
See application file for complete search history.

(56) References Cited

U.S. PATENT DOCUMENTS

| 5,404,488 A | 4/1995 | Kerrigan et al. |
| 5,649,186 A | 7/1997 | Ferguson |
| 5,819,284 A | 10/1998 | Farber et al. |
| 5,880,767 A | 3/1999 | Liu |
| 5,923,326 A * | 7/1999 | Bittinger et al. .............. 715/805 |
| 5,926,796 A | 7/1999 | Walker et al. |
| 5,974,549 A | 10/1999 | Golan |
| 6,085,186 A | 7/2000 | Christianson et al. |
| 6,094,657 A | 7/2000 | Hailpern et al. |
| 6,282,546 B1 | 8/2001 | Gleichauf et al. |
| 6,366,912 B1 | 4/2002 | Wallent et al. |
| 6,411,331 B1 | 6/2002 | Sansom-Wai et al. |

(Continued)

FOREIGN PATENT DOCUMENTS

| CA | 2496672 | 2/2004 |
| CN | 1265208 A | 8/2000 |

(Continued)

OTHER PUBLICATIONS

"European Search Report", Mailed Date: Dec. 2, 2010, Application No. EP/06786029, Filed Date: Nov. 30, 2010, pp. 9.

(Continued)

*Primary Examiner* — Isaac M Woo
(74) *Attorney, Agent, or Firm* — Henry Gabryjelski; Kate Drakos; Mikey Minhas

(57) ABSTRACT

System(s) and/or method(s) ("tools") are described that present indicia for implicitly and explicitly user-associated web pages of a network browser application. The tools can present these indicia in a single graphic user interface, in response to a user's selection of a single unified access point, or in response to a search of the browser's user-associated web pages.

20 Claims, 9 Drawing Sheets

(56) References Cited

U.S. PATENT DOCUMENTS

| | | | |
|---|---|---|---|
| 6,434,745 B1 | 8/2002 | Conley et al. | |
| 6,460,060 B1* | 10/2002 | Maddalozzo et al. | 715/234 |
| 6,544,295 B1 | 4/2003 | Bodnar | |
| 6,594,692 B1 | 7/2003 | Reisman | |
| 6,667,751 B1* | 12/2003 | Wynn et al. | 715/833 |
| 6,694,431 B1 | 2/2004 | Binding et al. | |
| 6,708,172 B1 | 3/2004 | Wong et al. | |
| 6,732,102 B1 | 5/2004 | Khandekar | |
| 6,775,772 B1 | 8/2004 | Binding et al. | |
| 6,917,302 B2* | 7/2005 | Lilleness et al. | 340/12.52 |
| 7,100,114 B1* | 8/2006 | Burleson | 715/744 |
| 7,143,084 B1 | 11/2006 | Rinearson et al. | |
| 7,257,564 B2 | 8/2007 | Loughmiller et al. | |
| 7,366,996 B2* | 4/2008 | Hoyle | 715/854 |
| 7,424,476 B2 | 9/2008 | Apparao et al. | |
| 7,685,426 B2* | 3/2010 | Ramos et al. | 713/176 |
| 7,730,054 B1 | 6/2010 | Marmaros et al. | |
| 7,831,547 B2 | 11/2010 | Epling et al. | |
| 2001/0032258 A1 | 10/2001 | Ishida et al. | |
| 2002/0108115 A1 | 8/2002 | Palmer | |
| 2002/0116630 A1 | 8/2002 | Stehlin | |
| 2002/0156905 A1 | 10/2002 | Weissman | |
| 2002/0174201 A1 | 11/2002 | Ramer et al. | |
| 2002/0194151 A1 | 12/2002 | Fenton et al. | |
| 2003/0014406 A1 | 1/2003 | Faieta et al. | |
| 2003/0117511 A1 | 6/2003 | Belz et al. | |
| 2003/0135504 A1 | 7/2003 | Elvanoglu et al. | |
| 2003/0167402 A1 | 9/2003 | Stolfo et al. | |
| 2004/0003097 A1 | 1/2004 | Willis et al. | |
| 2004/0046885 A1 | 3/2004 | Regan et al. | |
| 2004/0093563 A1 | 5/2004 | Pasquali | |
| 2004/0111319 A1 | 6/2004 | Matsumoto | |
| 2004/0122939 A1 | 6/2004 | Perkins | |
| 2004/0143683 A1 | 7/2004 | Greenwood | |
| 2004/0181753 A1 | 9/2004 | Michaelides | |
| 2004/0225749 A1 | 11/2004 | Pavlik et al. | |
| 2004/0230676 A1 | 11/2004 | Spivack et al. | |
| 2004/0250115 A1 | 12/2004 | Gemmel et al. | |
| 2004/0267815 A1 | 12/2004 | De Mesarjan | |
| 2005/0010595 A1 | 1/2005 | Brown et al. | |
| 2005/0015452 A1 | 1/2005 | Corson | |
| 2005/0033657 A1 | 2/2005 | Herrington et al. | |
| 2005/0038717 A1 | 2/2005 | McQueen, II | |
| 2005/0050460 A1 | 3/2005 | Bedingfield | |
| 2005/0065906 A1 | 3/2005 | Romero | |
| 2005/0097180 A1 | 5/2005 | Abdelhak | |
| 2005/0108227 A1 | 5/2005 | Russell-Falla et al. | |
| 2005/0119910 A1 | 6/2005 | Schneider | |
| 2005/0119913 A1 | 6/2005 | Hornreich et al. | |
| 2005/0165615 A1 | 7/2005 | Minar | |
| 2005/0171836 A1 | 8/2005 | Leacy | |
| 2005/0216439 A1 | 9/2005 | Kawakita | |
| 2005/0256768 A1 | 11/2005 | Robinson | |
| 2006/0230021 A1 | 10/2006 | Diab et al. | |
| 2006/0294124 A1 | 12/2006 | Cho | |
| 2007/0016543 A1 | 1/2007 | Epling | |
| 2007/0061711 A1 | 3/2007 | Bodin et al. | |
| 2007/0094389 A1 | 4/2007 | Nussey et al. | |
| 2007/0100836 A1 | 5/2007 | Eichstaedt et al. | |
| 2007/0100959 A1 | 5/2007 | Eichstaedt et al. | |
| 2007/0130518 A1 | 6/2007 | Shavit et al. | |
| 2007/0282973 A1 | 12/2007 | Chapman et al. | |

FOREIGN PATENT DOCUMENTS

| | | |
|---|---|---|
| WO | WO-0207013 | 1/2002 |
| WO | WO-2004107216 | 12/2004 |
| WO | WO-2005027402 | 3/2005 |
| WO | WO-2005089336 | 9/2005 |
| WO | WO-2005098675 | 10/2005 |

OTHER PUBLICATIONS

Kaasten, et al., "Designing an Integrated Bookmark / History System for Web Browsing", Retrieved at << http://grouplab.cpsc.ucalgary.ca/grouplab/uploads/Publications/Publications/2000-Kaasten.Skigraph.pdf>>, Proceedings of the Western Computer Graphics Symposium, Mar. 26-29, 2000, pp. 4.

Keller, et al., "A Bookmarking Service for Organizing and Sharing URLs", Proceeding: Selected papers from the sixth international conference on World Wide Web, vol. 29, Issue 08-13, Sep. 1997, pp. 1103-1114.

Gandhi, et al., "Domain Name Based Visualization of Web Histories in a Zoomable User Interface", Proceeding DEXA '00 Proceedings of the 11th International Workshop on Database and Expert Systems Applications, Date: Sep. 4, 2000, pp. 591-598.

"Adobe Acrobat 7.0.5: Acrobat Tracker", Retrieved from http://partners.adobe.com/public/developer/en/acrobaVsdk/pdf/javascriptJTracker.pdf, (Jul. 27, 2005),48 pages.

"FeedBurner: About Syndication, RSS, and Other Web-Altering Chemicals", Retrieved from http://www.feedburner.com/fb/a/aboutrss;jsessionid=96C24011924801F8B3CAF4F12B66B75D__.app2 on Jun. 21, 2005,2 pages.

Final Office Action, U.S. Appl. No. 11/179,155, (Apr. 30, 2009),8 pages.

Final Office Action, U.S. Appl. No. 11/179,155, (Dec. 21, 2009),8 pages.

Final Office Action, U.S. Appl. No. 11/179,155, (May 1, 2008),7 pages.

Foreign Office Action, Application Serial No. 200680025300.9, (Mar. 27, 2009),11 pages.

Foreign Office Action, Application Serial No. 200680025300.9, (Mar. 2, 2010),12 pages.

Foreign Office Action, Chinese Application No. 200680025300.9, (Jun. 25, 2010),12 pages.

"I/ON User Guide", Retrieved from http://openvision.tv/home/viewer/tutorial on Jan. 16, 2006, 7 pages.

"iSpeak It: Web Feeds and Podcasts", Retrieved from http://www.zapptek.com/ispeak-iU webpage.html on Jun. 21, 2005, Zapp Tek, (2002),4 pages.

"Latest Headline Viewer News and Information", Version: 0.9.9, Mar. 2, 2005, printed from website: http://www.headlineviewer.com/newslindex.shtml on Jun. 21, 2005, (Mar. 2, 2005),4 pages.

"MX RSS Reader-Writer: Use RSS Feeds in Your Sites", *InterAKT*, Retrieved from http://www.interakonline.com/Products/Dreamweaver-Extensions/MXRSSReader-Writerl __Overviewl ?from=!:j!:j__rss on Jun. 21, 2005, 2 pages.

Non Final Office Action, U.S. Appl. No. 11/179,155, (Jul. 14, 2009),6 pages.

Non Final Office Action, U.S. Appl. No. 11/179,155, (Nov. 28, 2008),6 pages.

Non Final Office Action, U.S. Appl. No. 11/179,155, (Jul. 6, 2007),9 pages.

Non-Final Office Action, U.S. Appl. No. 11/179,155, (Mar. 2, 2010),7 pages.

Notice of Allowance, U.S. Appl. No. 11/179,155, (Jul. 26, 2010),7 pages.

"Project: RSS Viewer: Summary", *SourceForge*, 2005, Retrieved from http://sourceforge.net/__projects/rssview/ on Jun. 21, 2005, 4 pages.

"Restriction Requirement", U.S. Appl. No. 11/179,155, (Feb. 12, 2008),6 pages.

"Six Apart: Developer Documentation: TrackBack Technical Specification", Retrieved from http://www.sixapart.com/pronet/docs/trackback spec on Feb. 15, 2008, 5 pages.

"Welcome to Feed on Feeds, Your Server Side Personal RSS (and Atom!) Aggregator", Retrieved from http://feedonfeeds.com/ on Jun. 21, 2005, 4 pages.

"What is Reptile?", Retrieved from http://reptile.openprivacy.org/overview.html on Jun. 21, 2005, (2001),4 pages.

Andersen, Starr et al., "Changes to Functionality in Microsoft Windows XP", Retrieved from http://www.microsoft.com/techneUprodtechnol/__winxppro/maintain/sp2brows.mspx on Jul. 7, 2005, (Aug. 9, 2004),58 pages.

Apple Computer Inc., "Mac OS X Server Collaboration Services", Retrieved from http://www.apple.com/server/macosx/features/collaborationservices.html on Jun. 21, 2005, 3 pages.

(56) References Cited

OTHER PUBLICATIONS

Apple, "Safari RSS: Your Desktop is the New Doorstep", Retrieved from http://www.apple.com/macosx/features/safari/ on Jun. 21, 2005, 4 pages.
Galbraith, David et al., "RSS Ping", Retrieved from http://rssping.com on Jan. 16, 2006, 2 pages.
Google, Inc., "Google Search Appliance Feeds Protocol Developer's Guide", Retrieved from http://code.google.com/gsa_apis/feedsguide.html on Jun. 21, 2005, (Jun. 2, 2005), 11 pages.
Microsoft, "Increase Your Browsing and E-Mail Safety", Retrieved from http://www.microsoft.com/security/incidenU_settings.mspx on Jul. 7, 2005, (Oct. 3, 2003),4 pages.
Mozilla, "Firefox—Rediscover the Web", Retrieved from http://www.mozilla.org/products/firefox on Jul. 7, 2005, (Jun. 17, 2005),4 pages.
Munsch, John "Dreams of a Rarebit Fiend", Retrieved from http://www.johnmunsch.com/projects/HotSheeU on Jun. 21, 2005, 6 pages.
Tetrault, Gregory "Review: Anonymizer Ultimate Security Suite", Retrieved from http://www.atpm.com/81.09/anonymizer.shtml on Jul. 7, 2005, *ATPM*, (Sep. 2002),12 pages.
PCT International Search Report and Written Opinion in Application PCT/US2006/025689, mailed Sep. 17, 2007, 9 pgs.
U.S. Appl. No. 11/179,155, Amendment and Response filed Dec. 5, 2007, 13 pgs.
U.S. Appl. No. 11/179,155, Amendment and Response filed Feb. 27, 2008, 5 pgs.
U.S. Appl. No. 11/179,155, Amendment and Response filed Oct. 31, 2008, 10 pgs.
U.S. Appl. No. 11/179,155, Amendment and Response filed Apr. 10, 2009, 9 pgs.
U.S. Appl. No. 11/179,155, Amendment and Response filed Jun. 30, 2009, 10 pgs.
U.S. Appl. No. 11/179,155, Amendment and Response filed Aug. 19, 2009, 11 pgs.
U.S. Appl. No. 11/179,155, Amendment and Response filed Feb. 17, 2010, 18 pgs.
U.S. Appl. No. 11/179,155, Amendment and Response filed Apr. 21, 2010, 13 pgs.
Chinese Decision on Re-Examination in Application 200680025300.9, mailed Jun. 21, 2012, 8 pgs.
Chinese Notice on Third Office Action in Application 200680025300.9, mailed Jul. 9, 2012, 6 pgs.
Chinese Notice of Allowance in Application 200680025300.9, mailed Sep. 26, 2012, 6 pgs.
Korean Notice of Preliminary Rejection in Application 10-2008-7000928, mailed Sep. 24, 2012, 4 pgs.
Korean Final Rejection in Application 10-2012-7030486, mailed Jul. 31, 2013, 6 pgs.
Korean Notice of Preliminary Rejection in Application 10-2013-7031797, mailed Feb. 24, 2014, 9 pgs.
Nadeem, et al., "A Study of Three Browser History Mechanisms for Web Navigation", In Proceedings of Fifth International Conference on Information Visualisation, Jul. 25, 2001, located at: http://ieeexplore.ieee.org/stamp/stamp.jsp?tp=&arnumber=942034, 9 pgs.
Gandhi, et al., "Domain Name Based Visualization of Web Histories in a Zoomable User Interface", In Proceedings of 11th International Workshop on Database and Expert Systems Applications, 2000, located at: http://ieeexplore.ieee.org/stamp/stamp.jsp?tp=&arnumber=875085, 9 pgs.
Domingue et al., "Magpie: supporting browsing and navigating on the semantic web", In Proceedings of the 9th International Conference on Intelligent User Interfaces, 2004, located at: http://delivery.acm.org/10.1145/970000/964479/p191-, 8 pgs.
"First Office Action and Search Report Issued in Chinese Patent Application No. 201210517609.7", Mailed Date: Apr. 3, 2015, 11 pages.
Korean Trial Board Decision in Application 10-2012-7030486, mailed Oct. 29, 2014, 20 pgs.
"Office Action Issued in Korean Patent Application No. 10-2013-7031797", Mailed Date: Apr. 30, 2015, 5 Pages.

\* cited by examiner

SEARCHING AND BROWSING URLS AND URL HISTORY

RELATED APPLICATION

This application is a divisional of, and claims priority to U.S. patent application Ser. No. 11/179,155, filed on Jul. 12, 2005, now U.S. Pat. No. 7,831,547, the disclosure of which is incorporated by reference herein.

BACKGROUND

Network browser interfaces currently permit users to view locators for web pages. Some interfaces display universal resource locators (URLs) for a user's favorite web pages in a graphical user interface, for instance. And some interfaces display URLs for web pages that a user has visited. These interfaces may also show URLs for web pages found in searching a user's favorites or history. But these interfaces can make poor use of a user's display area, confuse users, or be difficult for users to navigate. Some interfaces, for example, present web-page histories in cascading drop-down menus, which can be hard for some users to navigate, especially those that cannot use a mouse well.

SUMMARY

System(s) and/or method(s) ("tools") are described that present indicia for implicitly and explicitly user-associated web pages of a network browser application. The tools can present these indicia in a single graphic user interface, in response to a user's selection of a single unified access point, or in response to a search of the browser's user-associated web pages.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The same numbers are used throughout the disclosure and figures to reference like components and features.

DETAILED DESCRIPTION

Overview

The following document describes tools that present indicia for implicitly and explicitly user-associated web pages of a network browser application. In one embodiment, the tools present these indicia in a single graphic user interface that floats or docks with the browser's user interface. In other embodiments, the indicia are presented in response to a user's selection of a single unified access point, opening the browser, or a search of the browser's user-associated web pages.

Exemplary Operating Environment

Figure 1:
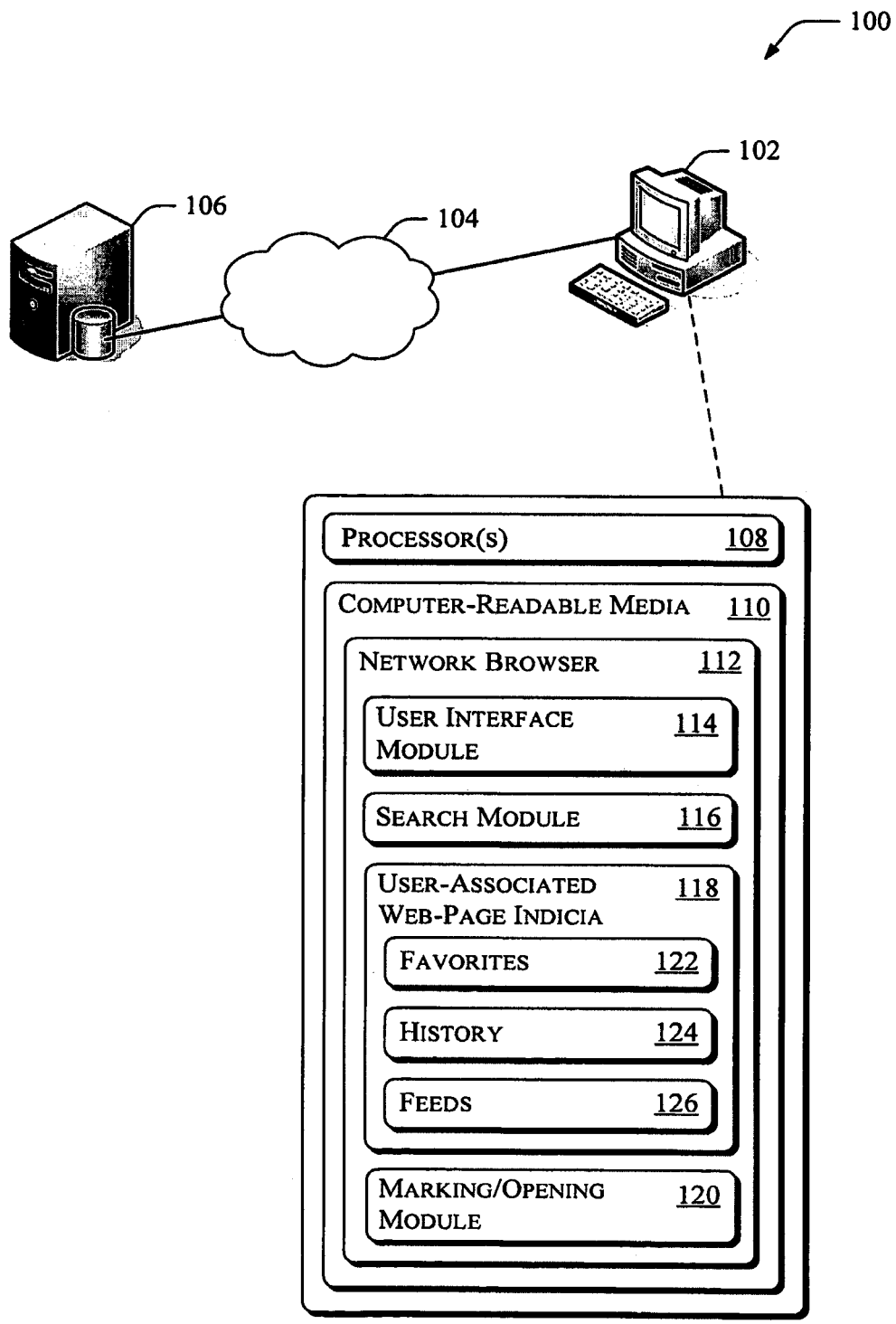
FIG. 1 illustrates an exemplary operating environment in which various embodiments can operate.

Before describing the tools in detail, the following discussion of an exemplary operating environment is provided to assist the reader in understanding where and how the tools may be employed. The description provided below constitutes but one example and is not intended to limit application of the tools to any one particular operating environment FIG. 1 illustrates one such operating environment generally at 100 comprising a computer 102, a communication network 104, and a network computer 106. The computer is shown comprising one or more processor(s) 108 and computer-readable media 110. The processor(s) are capable of executing instructions on the computer-readable media. The computer-readable media comprise instructions that implement a network browser 112 having a user interface module 114, a search module 116, user-associated web-page indicia 118, and a marking/opening module 120. These modules are shown integral with the network browser, though they may also be separate from the browser. If separate, each module is capable of communicating with the network browser, such as through one or more application programming interfaces (APIs). Indicia 118 has indicia for web pages that a user has explicitly or implicitly associated with himself or herself, such as favorite web pages indicia 122, history web pages indicia 124, and feed web pages indicia 126. The feed web pages are related to a user-associated feed or flag, such as a Rich Site Summary (RSS) feed. The user interface module is capable of presenting the indicia. The search module is capable of searching the indicia and related information, such as metadata for and content of the web page associated with each indicia. The marking/opening module enables a user to mark a group of web pages as one favorite and/or to open multiple web pages with a single user action.

The communication network enables communication between the computer and the network computer and may comprise one or more of an intranet, such as a company's internal network, the Internet, and the like.

Exemplary User Interfaces

Figure 2:
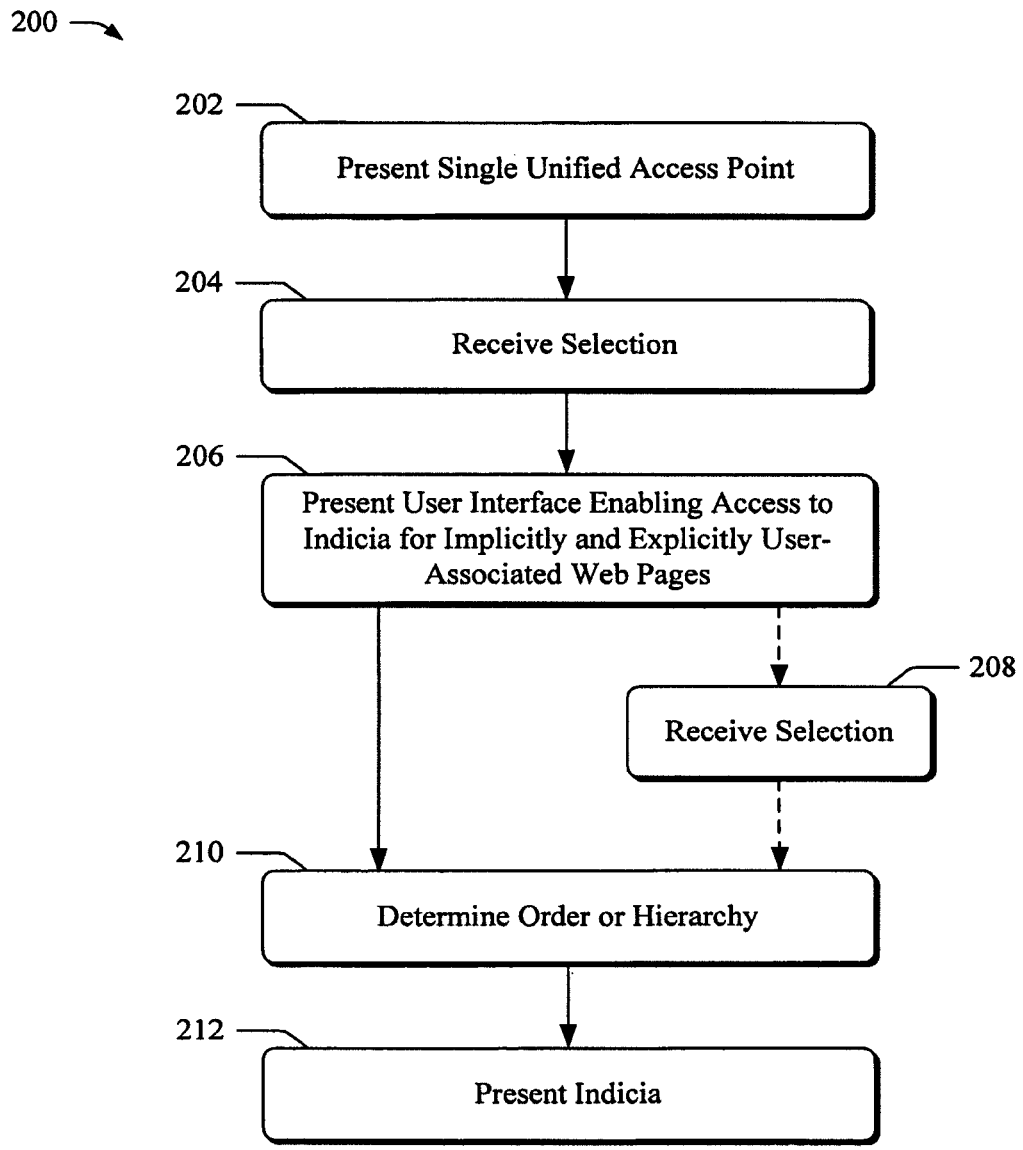
FIG. 2 is an exemplary process for presenting indicia of user-associated web pages.

The following discussion describes exemplary user interfaces and a related process for presenting indicia of user-associated web pages. The process is shown at 200 in FIG. 2 and describes exemplary manners in which the tools interface with a user of a network browser. This process is illustrated as a series of blocks representing individual operations or acts performed by elements of environment 100, such as user-interface module 114. This and other processes described herein are directed to these elements to aid the reader in understanding particular embodiments of the tools and are not intended to limit application of the tools to this environment. These processes can be implemented in any suitable hardware, software, firmware, or combination thereof In the case of software and firmware, these processes represent sets of operations implemented as computer-executable instructions.

Block 202 presents a single unified access point enabling a user to gain access to indicia for explicitly and implicitly user-associated web pages. The access point may comprise an icon, graphic, or selectable text. The user may select the access point with a single user action.

Figure 3:
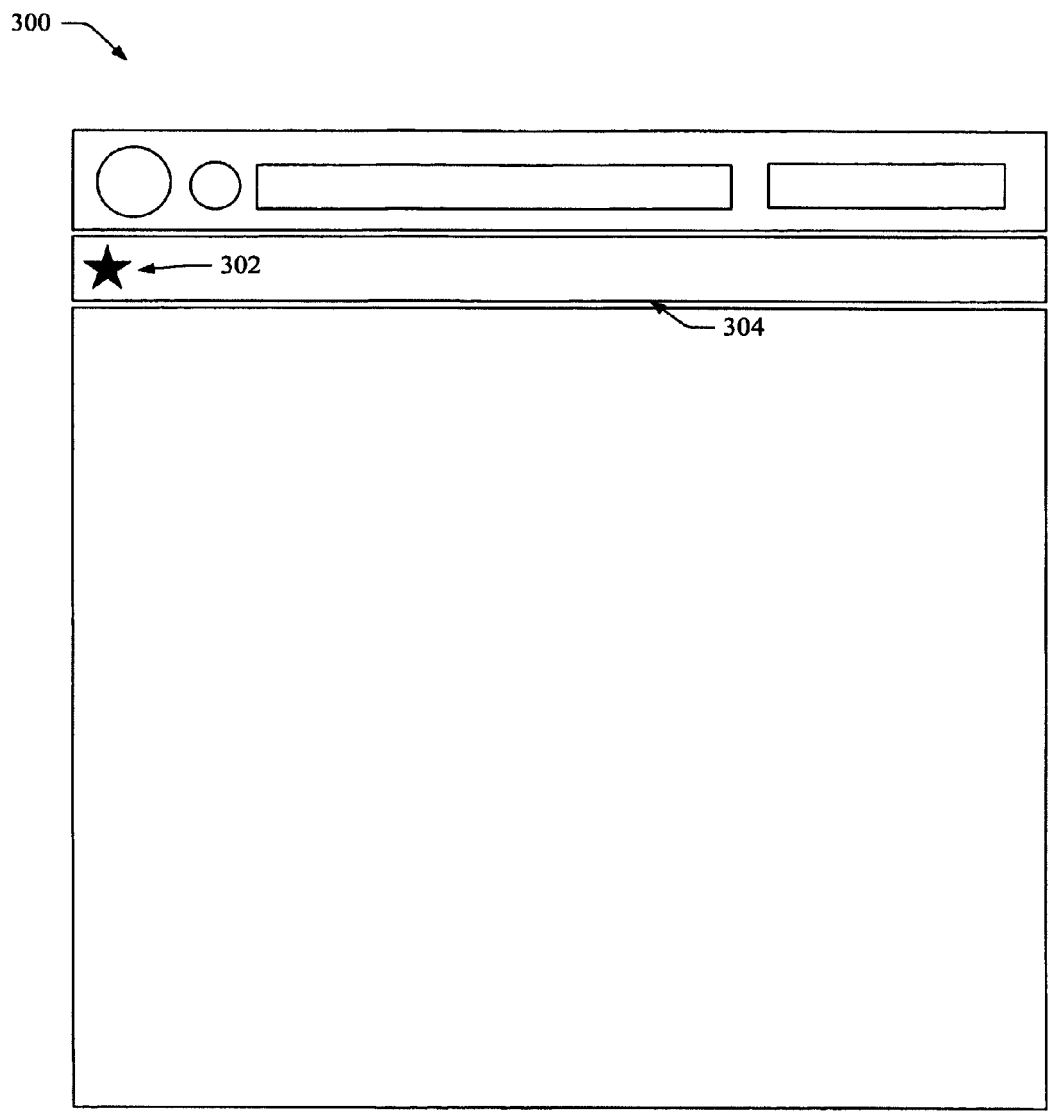
FIG. 3 illustrates an exemplary graphic user interface for a network browser having a single unified access point.

FIG. 3 sets forth an exemplary graphic user interface 300 for network browser 112 having a single unified access point 302 having a star icon. The selectable icon is oriented on the left side of the interface and within a command bar 304 that may have other selectable controls (not shown).

Block 204 receives a user's selection to present a user interface enabling access to indicia for explicitly and implicitly user-associated web pages. Block 204 can receive this selection through a user clicking on access point 302 shown in FIG. 3 or in other manners.

Block 206 presents a user interface enabling access to indicia for explicitly and implicitly user-associated web pages. This user interface can comprise a single navigable graphic user interface through which the indicia may be viewed and/or selected. It can be a window docked within a network browser's interface or be a floating entity, for instance. The indicia may be selected by the way in which the web pages are associated with a user, such as those explicitly associated with a user by the user marking the web pages as favorites, explicitly associated with a user by the user marking the web pages as feeds, and implicitly associated with a user by the user viewing the web pages thereby enabling a history of viewed web pages.

Figure 4:
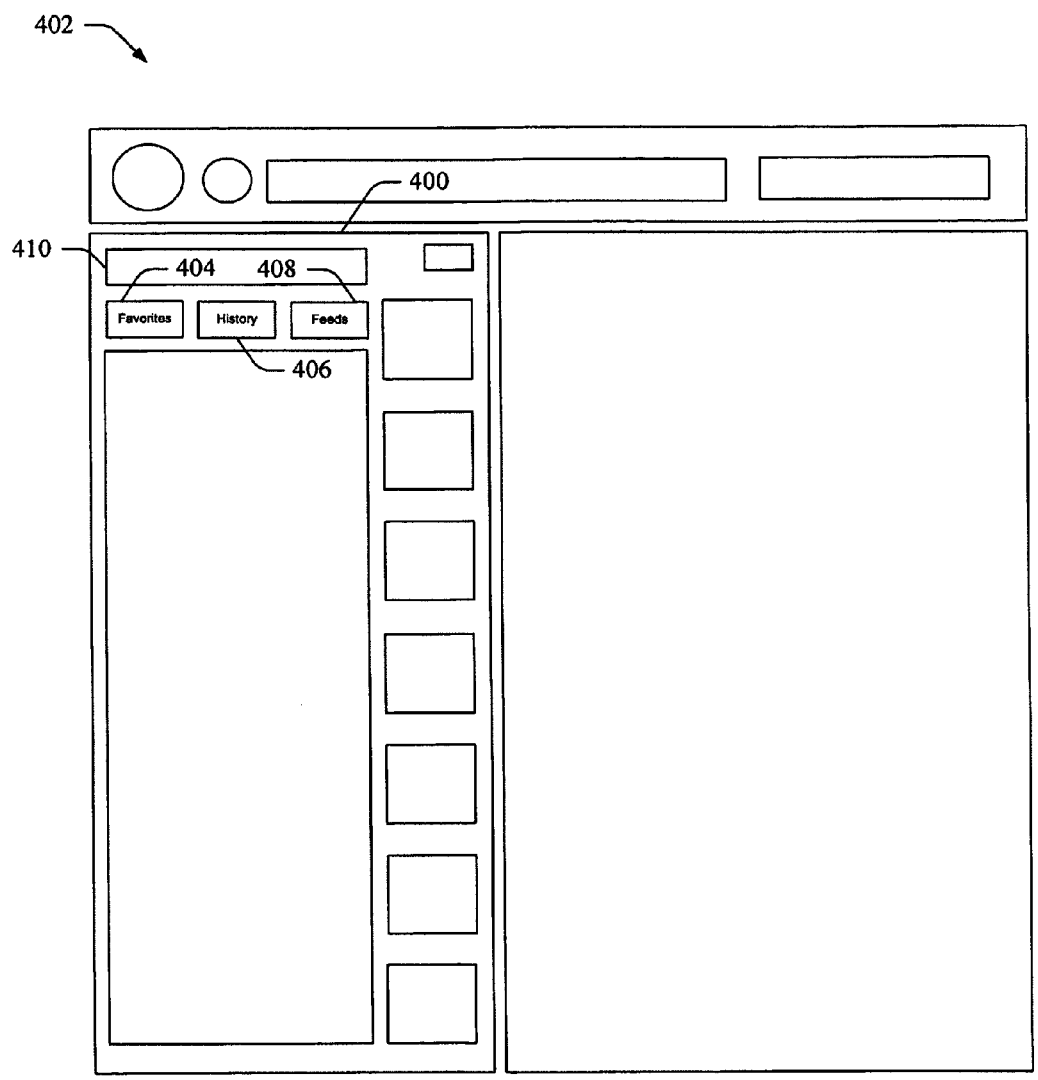
FIG. 4 illustrates an exemplary navigable window enabling access to indicia for a user's favorite web pages, feed web pages, and history web pages.

FIG. 4 sets forth an exemplary navigable window 400 enabling access to indicia for a user's favorite web pages, feed web pages, and history web pages. This interface is docked in network browser 112's user interface 402. Access to a user's favorites 122, history 124, and feeds 126 is enabled through selectable controls: 404 for favorites; 406 for history; and 408 for feeds. Each of these controls may be selected with a single user action. A search entry field 410 is also shown, and will be described in greater detail as part of process 600.

Block 208 receives selection to view indicia for one or more explicitly and/or implicitly user-associated web pages. Here block 208 receives a user's selection of favorites control 404 shown in FIG. 4.

Block 210 determines an order or hierarchy in which indicia will be displayed. Block 210 can order indicia for explicitly user-associated web pages alphabetically, chronologically, or following a user-selected order. Block 210 can set an order or hierarchy for indicia of implicitly user-associated web pages following various algorithms. One of these algorithms orders indicia with a weighted combination of when web pages were viewed and how often they were viewed, such as ordering indicia for pages visited most often in the last three weeks.

Block 212 presents indicia for explicitly and/or implicitly user-associated web pages in a graphic user interface. The graphic user interface can comprise one or multiple windows or regions. The indicia may be presented automatically (e.g., when a network browser is opened), responsive to selection by a user of a single unified access point, or responsive to a selection to view indicia for one or more types of user-associated web pages. Thus, block 212 may act independent of or responsive to blocks 204 and 208.

Figure 5:
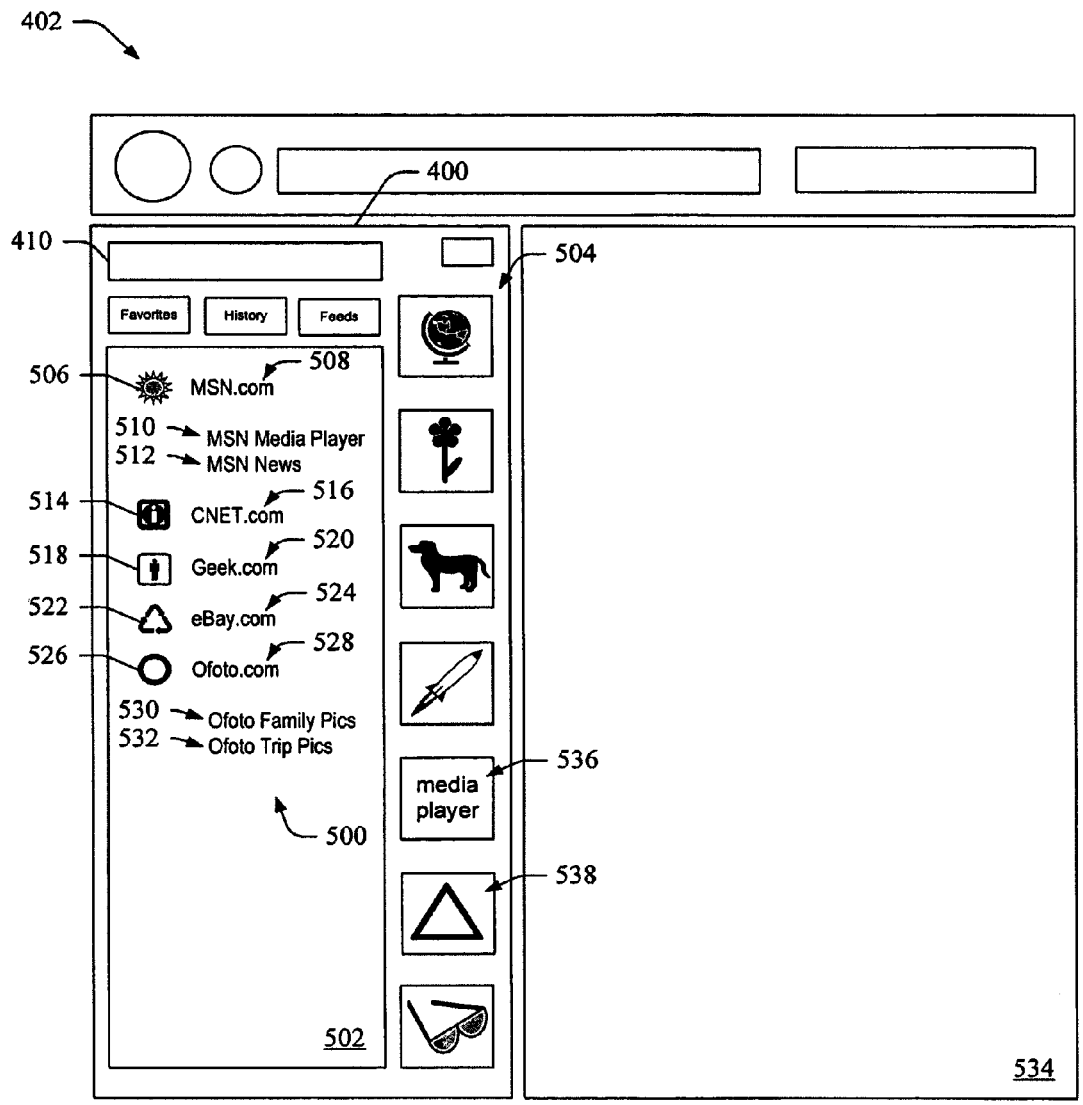
FIG. 5 illustrates the exemplary navigable window of FIG. 4 along with indicia for favorite web pages.

FIG. 5 sets forth the exemplary navigable window 400 of FIG. 4 along with indicia for favorites 500. These indicia are shown in indicia region 502. The indicia region can present indicia for different types of user-associated web pages, such as favorites, history, and feeds one at a time or in combination. Indicia for previously viewed (history) web pages are presented at history indicia region 504. Here user interface module 114 presents indicia for favorites 500 responsive to a user selecting favorites control 404 in FIG. 4. The user interface module presents history indicia 504 without user action. For clarity, the history indicia are shown in FIG. 5 but can also be presented in FIG. 4 responsive to selection of the star icon shown at 302.

Favorites indicia 500 are presented in a navigable hierarchy, the hierarchy defined by a user (though it may also be defined by user interface module 114). Here one favorite web page (entitled "MSN.com") is indicated with two indicia, a graphic at 506 and text at 508. The graphic or text may be user-defined, web-page defined, or defined by user interface module 114. Two other indicia are oriented subservient to "MSN.com". These other indicia are web pages that are related to and more specific than the parent "MSN.com." Indicia for these web pages have text, here descriptive titles, which are shown at 510 and 512. Similarly, indicia for other favorite web pages is also presented, here "CNET.com" at 514 and 516, "Geek.com" at 518 and 520, "eBay.com" at 522 and 524, "Ofoto.com" at 526 and 528, "Ofoto Family Pics" at 530, and "Ofoto Trip Pics" at 532. A user may select one or more of the indicia, after which network browser 112 loads the associated web page(s) into a web-page viewing area 534.

History indicia 504 are presented based on their order determined at block 210. Here user interface module 114 presents indicia for the top seven web pages based on which have been viewed by the user most often in the last three weeks. The indicia may comprise text or a graphic or icon (e.g., text 536 and icon 538). Here the indicia are square tiles comprising an icon provided by the particular web page or textual indicia created by user interface module 114.

The user interface module can use metadata associated with the web page to create indicia. For example, the user interface module can truncate the URL for the web page and display it. Often a first portion of a URL is not particularly descriptive of the page; truncating it can allow a descriptive indicia without requiring extensive space to present it. For example, for a URL of:

HTTP::
\\www.msn.com\uq2k3j42\239u8421d\mediaplayer

The user interface module truncates the URL to "mediaplayer." This indicia is shown at 536.

Searching User-Associated Web Pages

Figure 6:
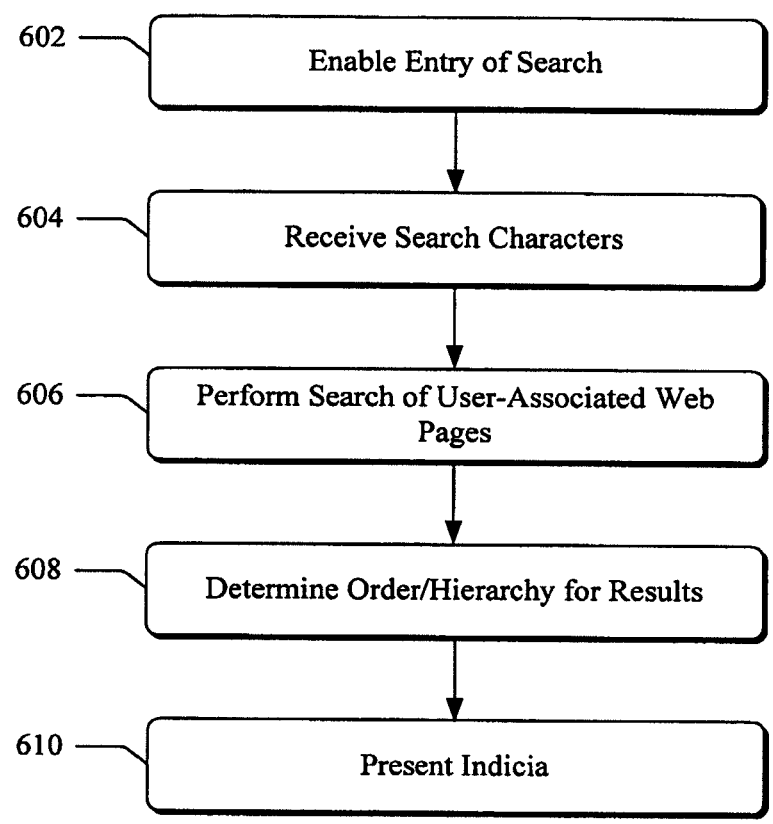
FIG. 6 is an exemplary process for searching user-associated web pages.

Process 600, shown in FIG. 6, describes exemplary methods for searching user-associated web pages. This process is illustrated as a series of blocks representing individual operations or acts performed by elements of environment 100, such as search module 116 and user interface module 114.

Block 602 enables a user to enter a search. Continuing the illustrated embodiment described above, user interface module 114 provides search entry field 410 as part of navigable window 400 of FIG. 4.

Figure 7:
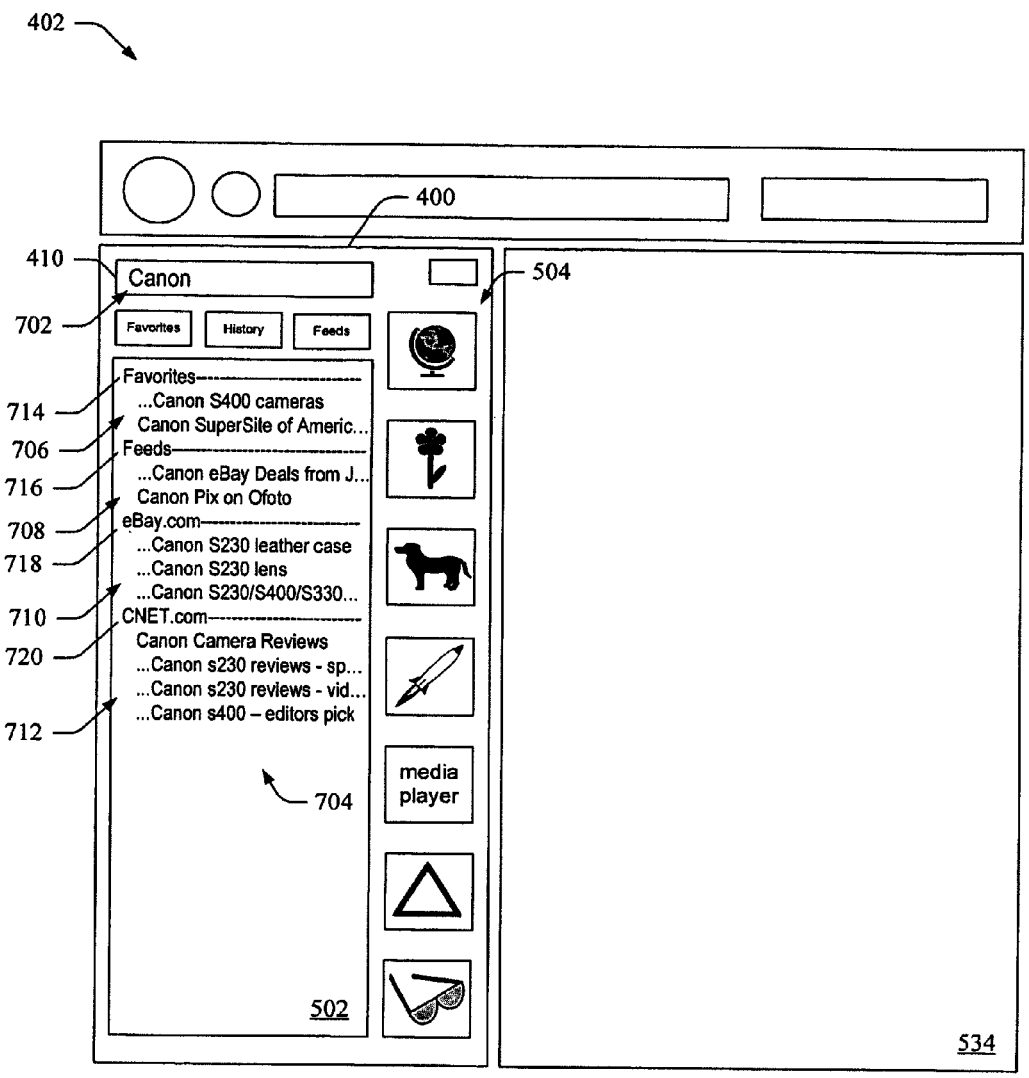
FIG. 7 illustrates the exemplary navigable window of FIG. 4 with a search term and search results.

Block 604 receives search characters, such as a word. FIG. 7 sets forth the window 400 of FIG. 4 with a search term "Canon" shown in field 410 at 702.

Block 606 searches user-associated web pages based on the search characters. Block 606 can search one type of user-associated web page, such as just history, feeds, or favorites.

Block 606 can also search multiple or all types, regardless of how the pages are associated with a user. This enables a user with a single search to see web pages having a search term or character that the user has viewed (either recently or ever), marked as a favorite, and marked as associated with a desired feed, for example. By default search module 116 searches all user-associated web pages.

Search module 116 can search with all of the search characters at once or one-at-a-time as they are entered. Here the search module searches character-by-character with each new character causing another search of that character and predecessor characters. So the search module searches for user-associated web pages and their indicia or other metadata for a "C", then for a "Ca", then for a "Can", and so forth. This can enable a user to quickly find user-associated web pages by searching in real time. A user may find the web page he or she is looking for with only "Can", thereby saving the user time.

Block 606 can search for character matches in a web page itself and metadata for the web page. Here the search module searches text in the web page itself and metadata. The metadata can comprise the web pages' titles or URLs, metatag keywords, metatag descriptions, and user-defined keywords.

Block 608 determines an order or hierarchy for the results, such as through a user-driven weighted search. Here search module 116 weighs the results based at least in part on user-driven factors for the web pages, such as user-defined keywords, user-defined titles, and the like. The search module orders the results of the "Canon" search with a highest weight given for a user-defined keyword match (if the web pages have user-defined keywords), followed by descending weighting factors for the titles and URLs, the full text, and the metatags.

Block 608 can also arrange the results into groups having a similarity. The grouping can be based on those web pages having the same domain name and/or the same user-associated type (e.g., history, feeds, and favorites). Here the results of the "Canon" search of the history, feeds, and favorites web pages comprise eleven web pages. The groups defined here are those web pages from favorites (two pages), those from feeds (two pages), those sharing the "eBay" domain name (three pages), and those sharing the "CNET" domain name (four pages).

Block 610 presents indicia for user-associated web pages responsive to the search. Block 610 can present the indicia in a flat list or a hierarchy (e.g., a tree). Here the user interface module presents indicia 704 oriented in a tree by groups 706, 708, 710, and 712 in indicia region 502 shown in FIG. 7. Group 706 is for web pages from the user's favorites having a group heading of "Favorites" shown at 714, group 708 is for web pages from the user's feeds having a group heading of "Feeds" shown at 716, group 710 is for web pages from eBay™ having a group heading of "eBay.com" shown at 718, and group 712 is for web pages from CNET™ having a group heading of "CNET.com" shown at 720.

The user interface module can present the indicia in real time, here with the search module presenting web pages having just a "C", then those having "Ca", and so forth (these results are not shown—only results of "Canon" are shown).

The indicia may comprise icons or graphics for the web pages (not shown). It may also comprise text resulting from the search. Text resulting from the search can comprise the search characters and surrounding, previous, or following characters. This provides the user with a small snap shot of the content of the web page. The indicia in FIG. 7 are all text from the search showing the search characters ("Canon") and the following text from the web page to the end of the sentence or the text that fits, whichever is less.

Marking and Opening Multiple Web Pages

The tools also enable a user to mark multiple web pages with a single user action. A user may mark a group of web pages as favorites or as one favorite for the entire group. The tools can also open multiple web pages with a single user action.

Figure 8:
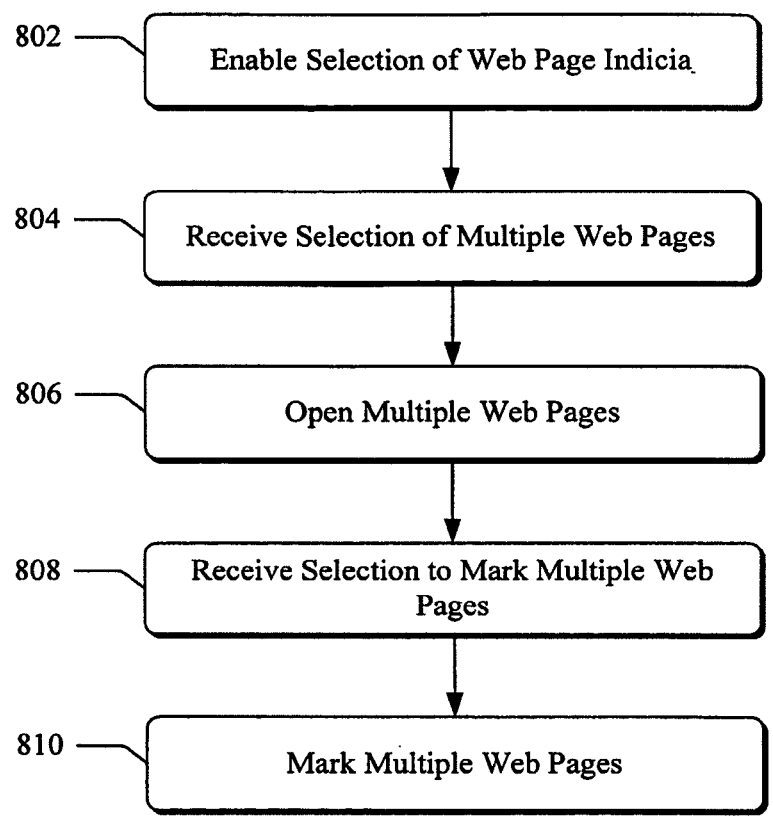
FIG. 8 is an exemplary process for marking and/or opening multiple web pages.

Process 800, shown in FIG. 8, describes exemplary methods for marking and opening multiple web pages. This process is illustrated as a series of blocks representing individual operations or acts performed by elements of environment 100, such as marking/opening module 120.

Block 802 enables selection of one or more indicia of multiple web pages. Block 802 can present indicia for web pages resulting from a search (either of user-associated web pages or otherwise), selection by a user, a list of user-associated web pages, or otherwise.

Continuing the illustrated embodiment described above, consider again FIG. 7. Here two sets of indicia are shown. One set comprises search results of user-associated web pages shown in groups, the indicia shown at 704. The other set comprises history indicia shown at 504. A user may select more than one of these indicia, such as by selecting multiple history indicia with highlighting. A user may also select a single indicia for multiple web pages, such as by clicking on a group heading (e.g., 714, 716, 718, or 720).

Block 804 receives a user's selection of multiple web pages. Here a user selects indicia for four web pages with a single user action, that of clicking on group heading 720 entitled "CNET.com."

Block 806 opens multiple web pages responsive to a user's selection. Here marking/opening module 120 opens web pages associated with the four indicia presented as part of group 712. The web pages may be presented in separate windows or one may be presented and the others readied for presentation.

Figure 9:
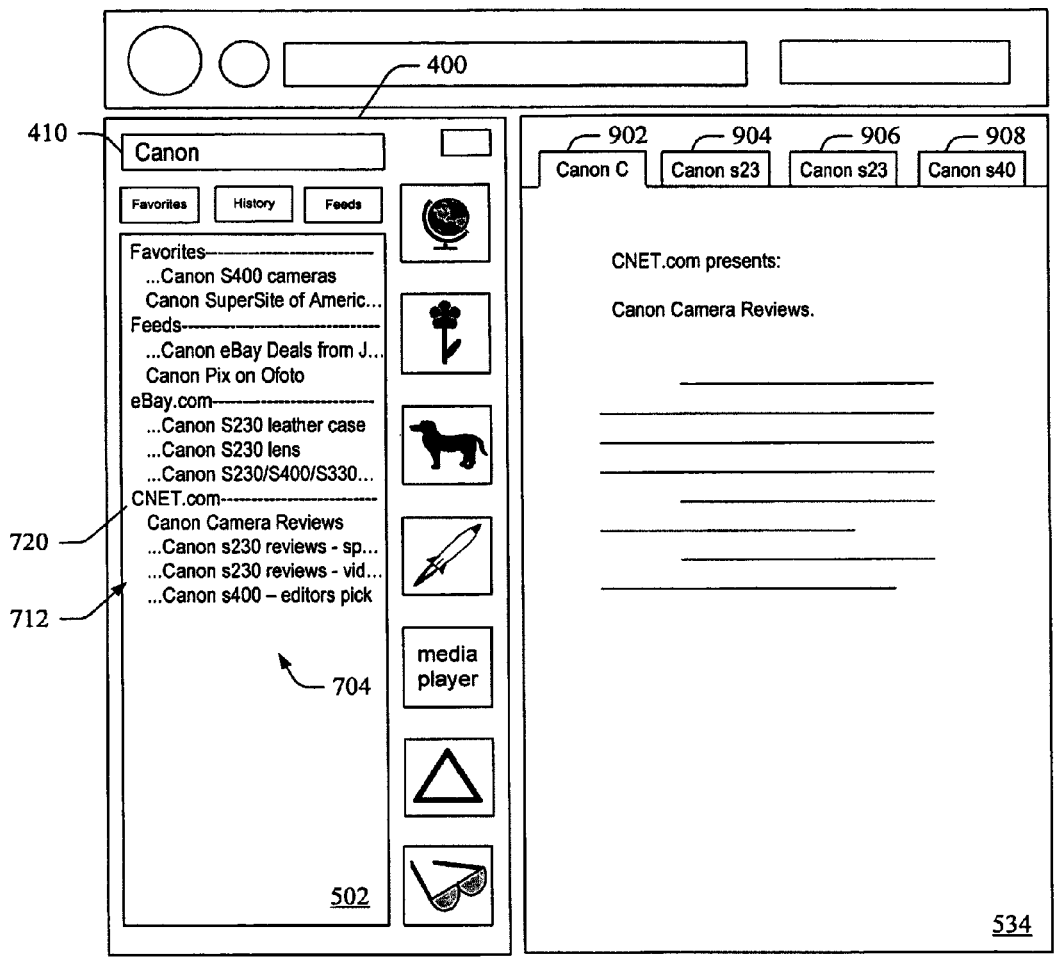
FIG. 9 illustrates the exemplary navigable window of FIG. 7 with opened web pages marked with tab indicators.

FIG. 9 sets forth the interface 402 of FIG. 7 with the opened web pages marked with tab indicators 902, 904, 906, and 908. One of the web pages (tabbed 902) is shown, the others may be brought to the foreground by selecting the appropriate tab. The tab may comprise indicia for the web page, such as an icon, title, truncated URL, or search indicia. The four CNET web pages are opened, the first in the group (with indicia of "Canon C" short for "Canon Camera Reviews") is displayed.

Block 808 receives a user's selection to mark multiple web pages. A user may select one indicia for multiple pages, all web pages currently opened, multiple indicia for multiple web pages, and the like. The user may do so with a single or multiple user actions. In FIG. 9, a user can select indicia to mark all the search results, those of a particular group, or various open web pages. A user can also select to mark all opened web pages. Here assume that a user selects heading 720 to mark the web pages of this group as a single favorite. The window 400 may present options enabling a user to open or mark the group, such as to open all the web pages in a group or save them as one or more favorites responsive to hovering over the indicia.

Block 810 marks multiple web pages. Here marking/opening module 120 marks all of the web pages under heading 720 as favorites responsive to the user's single action. The module can mark each web page as a separate favorite or as a single favorite having multiple web pages. Here the module marks a single favorite having these four web pages.

After marking web pages as a single favorite, a user may select to open all of the web pages in the favorite with a single user action. The tools may do so following block 802 or otherwise.

Conclusion

The above-described tools present indicia for implicitly and explicitly user-associated web pages of a network browser application. They can permit a user to view and interact with different types of user-associated web pages in a single graphic interface. This can make easier or more intuitive a user's interaction with his or her favorite, feed, and history web pages. Although the tools have been described in language specific to structural features and/or methodological acts, it is to be understood that the subject matter defined in the appended claims is not necessarily limited to the specific features or acts described. Rather, the specific features and acts are disclosed as exemplary forms of implementing the claimed system, method, and/or computer-readable media.

What is claimed is:

1. One or more computer-readable media embodying computer-readable instructions that, when executed, implement a method comprising:
   receiving a selection to present indicia for implicitly user-associated web pages and explicitly user-associated web pages of a network browser application, wherein the implicitly user-associated web pages are web pages implicitly associated with a user upon accessing the web pages, and wherein the explicitly user-associated web pages are web pages explicitly associated with the user; and
   presenting, by the network browser application, the indicia in a navigable window within a graphical user interface of the network browser application, wherein the navigable window includes selectable controls for alternately displaying the indicia for the implicitly and explicitly user-associated web pages.

2. The media of claim 1, further comprising presenting a single unified access point and wherein receiving the selection comprises receiving selection of the single unified access point with a single received action.

3. The media of claim 1, wherein presenting the indicia comprises presenting the indicia arranged in two or more groups, each of the groups having a group indicia, and further comprising:
   enabling selection of one of the group indicia with a single received action;
   receiving selection of one of the group indicia to provide selected web pages associated with the group indicia; and
   associating the selected web pages with a user.

4. The media of claim 1, wherein presenting the indicia further comprises ordering the indicia in a hierarchy determined by the network browser application.

5. The media of claim 1, wherein the navigable window further comprises a search entry field configured to enable a search of the implicitly and explicitly user-associated web pages.

6. The media of claim 5, wherein presenting the indicia further comprises:
   determining a hierarchy of the indicia based, at least in part, on input in the search entry field; and
   presenting the indicia in the determined hierarchy.

7. A computer-implemented method, the method comprising:
   receiving a selection to present indicia for implicitly user-associated web pages and explicitly user-associated web pages of a network browser application, wherein the implicitly user-associated web pages are web pages implicitly associated with a user upon accessing the web pages, and wherein the explicitly user-associated web pages are web pages explicitly associated with the user; and
   presenting, by the network browser application, indicia for one of the implicitly and explicitly user-associated web pages in a navigable window within a graphical user interface of the network browser application, wherein the navigable window includes a selectable control for alternately displaying the indicia for the other of the implicitly and explicitly user-associated web pages.

8. The computer-implemented method of claim 7, further comprising presenting a single unified access point and wherein receiving the selection comprises receiving selection of the single unified access point with a single received action.

9. The computer-implemented method of claim 7, further comprising:
   enabling selection of two or more of the indicia with a single received action;
   receiving selection of two or more of the indicia to provide selected indicia; and
   opening web pages associated with the selected indicia without a further received action.

10. The computer-implemented method of claim 7, wherein presenting the indicia for one of the implicitly and explicitly user-associated web pages in a navigable window comprises presenting the indicia arranged in two or more groups, each of the groups having a group indicia, and further comprising:
    enabling selection of one of the group indicia with a single received action;
    receiving selection of one of the group indicia to provide selected web pages associated with the group indicia; and
    associating the selected web pages with a user.

11. The computer-implemented method of claim 7, wherein presenting the indicia for one of the implicitly and explicitly user-associated web pages in a navigable window further comprises ordering the indicia in a hierarchy determined by the network browser application.

12. The computer-implemented method of claim 7, wherein the navigable window further comprises a search entry field configured to enable a search of the implicitly and explicitly user-associated web pages.

13. The computer-implemented method of claim 12, wherein presenting the indicia for one of the implicitly and explicitly user-associated web pages in a navigable window further comprises:
    determining a hierarchy of the indicia based, at least in part, on input in the search entry field; and
    presenting the indicia in the determined hierarchy.

14. A system comprising:
    a processor; and
    a memory coupled to the processor, the memory for storing instructions which, when executed by the processor, performs a method, the method comprising:
    receiving a selection to present indicia for implicitly user-associated web pages and explicitly user-associated web pages of a network browser application, wherein the implicitly user-associated web pages are web pages implicitly associated with a user upon accessing the web pages, and wherein the explicitly user-associated web pages are web pages explicitly associated with the user; and
    presenting indicia for one of the implicitly and explicitly user-associated web pages in a navigable window within a graphical user interface of the network browser application, wherein the navigable window includes a selectable control for alternately displaying the indicia for the other of the implicitly and explicitly user-associated web pages.

15. The system of claim 14, wherein the presenting the indicia for one of the implicitly and explicitly user-associated web pages in a navigable window further comprises presenting the indicia in one or more groups sharing a similar feature.

16. The system of claim 14, wherein the navigable window further comprises a search entry field configured to enable a search of the implicitly and explicitly user-associated web pages.

17. The system of claim 16, wherein the indicia associated with the implicitly and explicitly user-associated web pages are determined, based at least in part, on input from the search entry field of the navigable window.

18. The system of claim 16, wherein presenting the indicia for one of the implicitly and explicitly user-associated web pages in a navigable window further comprises:
   determining a hierarchy of the indicia based, at least in part, on input in the search entry field; and
   presenting the indicia in the determined hierarchy.

19. The system of claim 14, wherein the indicia of the implicitly user-associated web pages are presented in an order, determined by the network browser application, reflecting a number of times that the implicitly user-associated web pages have been viewed.

20. The system of claim 14, further comprising presenting a single unified access point, wherein receiving the selection comprises receiving selection of the single unified access point with a single received action.

\* \* \* \* \*